G. E. ELIA.
APPARATUS FOR DETECTING AND INDICATING THE PRESENCE OF SUBMARINE BOATS.
APPLICATION FILED JULY 16, 1917.
1,278,319.
Patented Sept. 10, 1918.
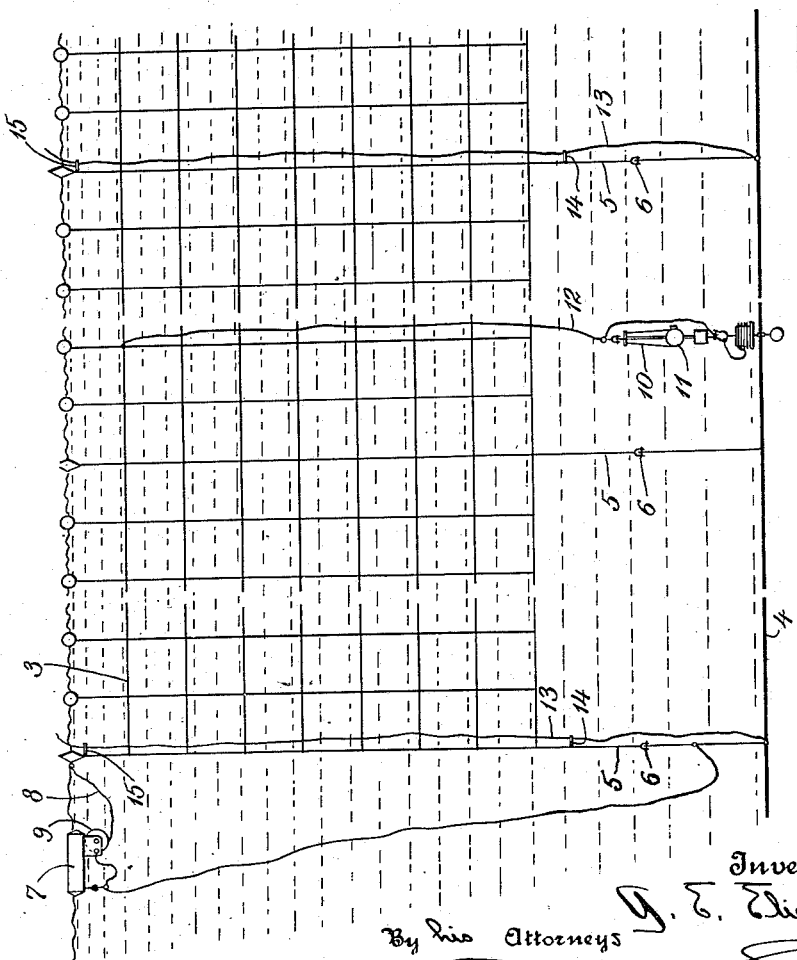

UNITED STATES PATENT OFFICE.

GIOVANNI EMANUELE ELIA, OF NEW YORK, N. Y.

APPARATUS FOR DETECTING AND INDICATING THE PRESENCE OF SUBMARINE BOATS.

1,278,319.   Specification of Letters Patent.   Patented Sept. 10, 1918.

Application filed July 16, 1917. Serial No. 180,730.

*To all whom it may concern:*

Be it known that I, GIOVANNI EMANUELE ELIA, a subject of the King of Italy, residing at Hotel Ritz-Carlton, city of New York, in the county of New York, State of new York, have invented certain new and useful Improvements in Apparatus for Detecting and Indicating the Presence of Submarine Boats; and I do hereby declare the following to be a full, clear, and exact description of the invention, such as will enable others skilled in the art to which it appertains to make and use the same.

This invention relates to apparatus for detecting and indicating the presence of submarine boats of the type consisting of a net barrier adapted to be submerged in the sea in a position where it may be engaged by a submarine boat and propelled through the water thereby. The invention may be used in connection with net barriers for this purpose of various types and constructions, but it is of special utility in connection with net barriers heretofore invented by me and consisting of a plurality of net sections, a submerged series cable to which each of the several net sections is individually connected in such a way as to permit it to be detached from the series cable without disarranging the other net sections, and a plurality of automatic signaling devices, as for instance, wireless telegraph transmitters, one for each net section and each arranged to assume an operative position and send its signal automatically when the corresponding net section is carried away by a submarine boat.

The present invention involves the provision of an improved construction for such a net section or net barrier whereby the operation of placing the net or the barrier consisting of a plurality of nets in position in the sea or shifting it from one position to another or restoring it to its original position after it has drifted therefrom is greatly facilitated. The invention involves equipping such a net section or net barrier with connections through which it may be towed and which are adapted to raise the bottom portion of the net section or the net barrier and transmit the towing strain or a portion of it thereto.

The form of net structure with which the invention is preferably employed is that consisting of a net barrier made up of a large number of net sections each independently connected to a series cable extending the whole length of the barrier and adapted to be submerged in the sea, either sustained at a considerable distance below the surface or resting on bottom. With a net barrier of this construction the towing devices preferably consist of cables which may be affixed to the tow or tows for the barrier and which are so arranged that the towing strain is transmitted in part to the series cable. For this purpose a plurality of towing cables are provided each connected at one end to the series cable of the barrier and each extending upwardly from the series cable through one or more rings which are secured to the net at various positions thereon. When the end of such a towing cable is secured to the towing boat and the latter is propelled through the water, the entire length of the towing cable is subjected to strain and this strain is imparted to the net barrier at distributed points thereon, including the point where the towing cable is connected to the series cable. This series cable is therefore lifted more or less and it is drawn forward so that it does not impose an undue strain upon the net structure. The use of towing cables thus arranged facilitates the operation of positioning the barrier in the sea and it is of special importance when the series cable has heavy weights attached thereto, such as those used for anchoring the series cable and those employed at the points of connection of the signaling devices to the series cable.

The features of the invention above outlined will be better understood by reference to the following description taken in connection with the accompanying drawing, which illustrates diagrammatically the preferred embodiment of the invention and in which Figure 1 is a view in elevation and Fig. 2 is a transverse section.

Referring to these figures, Fig. 1 shows a portion of a net barrier made up of a plurality of net sections each connected individually to a series cable. One of the net sections is shown at 3 and the series cable is shown at 4. The net section 3 may be as much as 1,000 feet in length and a great number of the net sections may be employed to constitute the barrier. Each net section is connected at two or more points by cables 5 extending from the lower edge of the net section to the series cable 4 and in each of these connections 5 is a weakened portion 6 in the form of a shearing pin which will give way when the connection 5 is subjected to a predetermined strain. Thus, when a submarine boat engages the net section 3 and carries it away, the connections 5 are drawn taut and are then broken at the shearing pin 6, resulting in detachment of the net section 3 from the series cable 4 without disarrangement of the other sections which make up the net barrier. A float 7 is connected to the net section 3 by a cable 8 which is wound on a reel 9. The function of the float 7 is to indicate the position of the net section 3 after it has been carried away and the winding of the connection 8 on the reel 9 permits the float 7 to remain on the surface when the net section is carried under.

Each net section preferably has a signal transmitter associated therewith arranged to operate automatically to send its signal when the net section is carried away. In Fig. 1, the signaling device is shown as a wireless telegraph signal transmitter consisting of an aerial 10 mounted on a buoy 11. This transmitter is connected to the series cable 4 and a cable 12 leading to the net section 3 controls the connection to the cable 4 so that when the net section is carried away, this connection is broken automatically and the buoyant signal transmitter rises to the surface. As it does so, parts within the signal transmitter operate automatically to cause the transmitter to transmit its signal after it has reached the surface.

In order to facilitate the operation of positioning the net barrier in the sea and changing it from one position to another, each net section 3 is provided with a plurality of towing cables 13. Each of these towing cables is connected at its lower end to the series cable 4 and it passes upwardly from the point of connection to the series cable 4 through one or more rings affixed to the net section 3. In the present instance, each towing cable 13 is shown as extending through a ring 14 connected to the net section 3 near the lower edge thereof and a second ring 15 connected to the net section near the upper edge thereof. Each towing cable 13 extends beyond the upper ring 15 such a distance as to eliminate all danger of the end of the cable slipping back entirely through the ring.

When the net is in position, the free ends of the towing cables 13 hang down loosely. When it is desired to move the net section 3 or a net barrier including a plurality of the net sections, the towing boat or boats pick up the free ends of the towing cables 13, make them fast and then proceed to the new position. As the several towing cables are drawn taut, they pull upwardly on the series cable 4 so as to sustain the weight of the series cable and the anchors or other devices secured thereto. As the series cable 4 is lifted, the towing cables 13 pass freely through the rings 14 and 15 more or less. In addition to sustaining the weight of the series cable 4 and the parts affixed thereto, the towing cables 13 serve to transmit the towing strain to the net section or net barrier at a plurality of points distributed thereover.

What I claim is:

1. Apparatus for detecting and indicating the presence of submarine boats comprising the combination of a net adapted to be submerged in the sea in position to be engaged by a submarine boat and a towing cable connected to the net at a plurality of points, the connection of the cable to the net at certain of said points being arranged to permit movement of the cable relative to the net; substantially as described.

2. Apparatus for detecting and indicating the presence of submarine boats comprising the combination of a net adapted to be submerged in the sea in position to be engaged by a submarine boat and a towing cable connected to the net near the lower edge thereof and passing through one or more rings secured to the net; substantially as described.

3. Apparatus for detecting and indicating the presence of submarine boats comprising the combination of a net barrier consisting of a plurality of net sections and a series cable to which the net sections are individually connected, and a towing cable fastened to the series cable and so engaging a net section near the upper edge thereof as to permit movement of the towing cable relatively to the upper portion of the net section; substantially as described.

4. Apparatus for detecting and indicating the presence of submarine boats comprising the combination of a net barrier consisting of a plurality of net sections and a series cable to which the several net sections are individually connected, and a plurality of towing cables each secured at its end to the series cable and each passing through one or more rings secured to a net section, one of which rings is near the upper edge of the net section; substantially as described.

5. Apparatus for detecting and indicating the presence of submarine boats comprising the combination of a net adapted to be submerged in the sea in position to be engaged by a submarine boat and a towing cable affixed to the net and adapted to transmit a portion of the towing strain imposed thereon to the lower portion of the net; substantially as described.

6. Apparatus for detecting and indicating the presence of submarine boats comprising the combination of a net adapted to be submerged in the sea in position to be engaged by a submarine boat, and a plurality of towing cables connected to the net and adapted to lift the lower portion of the net and transmit the towing strain to points distributed over the surface of the net; substantially as described.

In testimony whereof I affix my signature.

GIOVANNI EMANUELE ELIA.